L. C. DAVIDSON.
LOAD GRIPPING MECHANISM FOR CONVEYERS.
APPLICATION FILED OCT. 26, 1908.
934,890.
Patented Sept. 21, 1909.
2 SHEETS—SHEET 1.
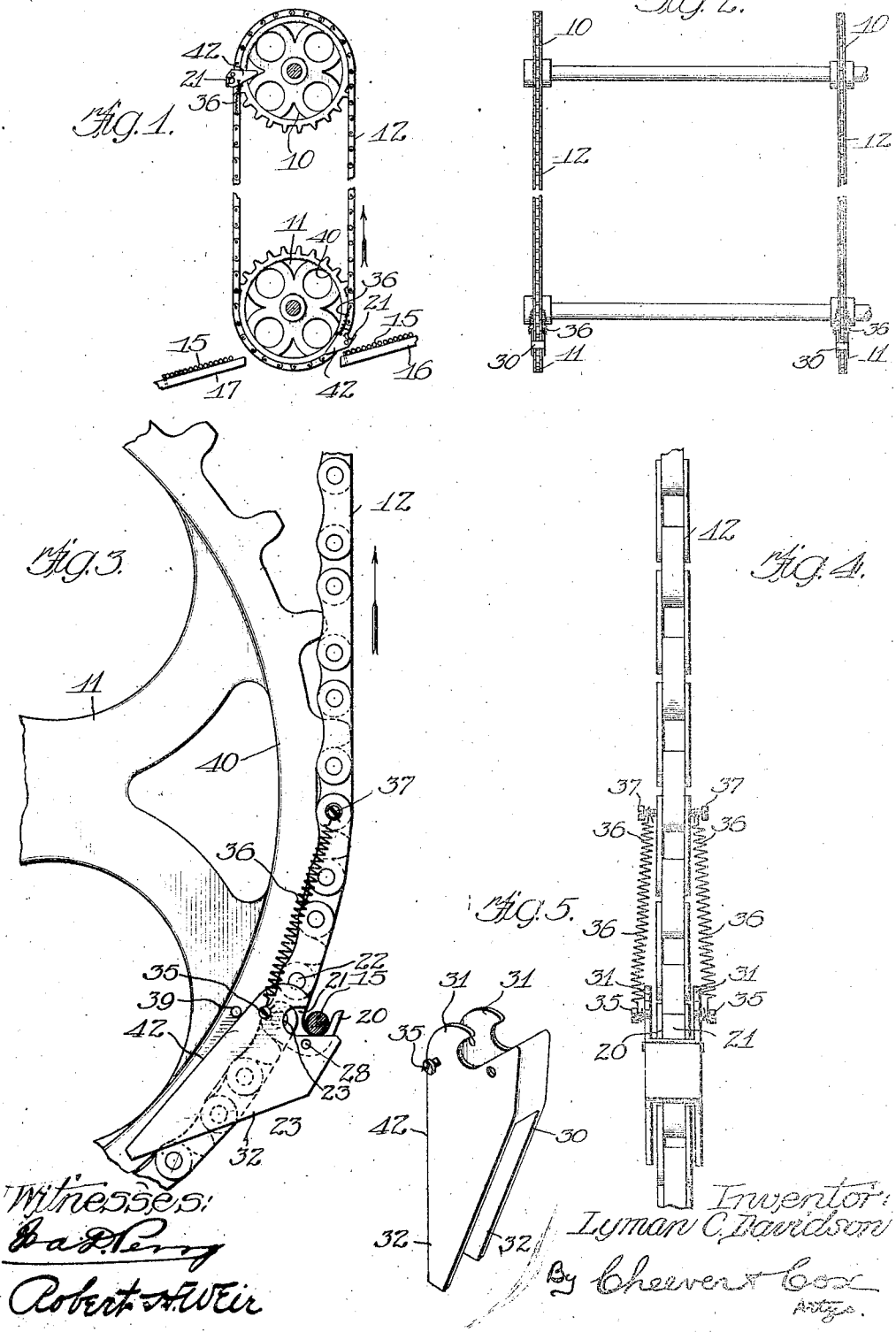
Witnesses:
Inventor:
Lyman C. Davidson
By Cheever & Cox
Attys.

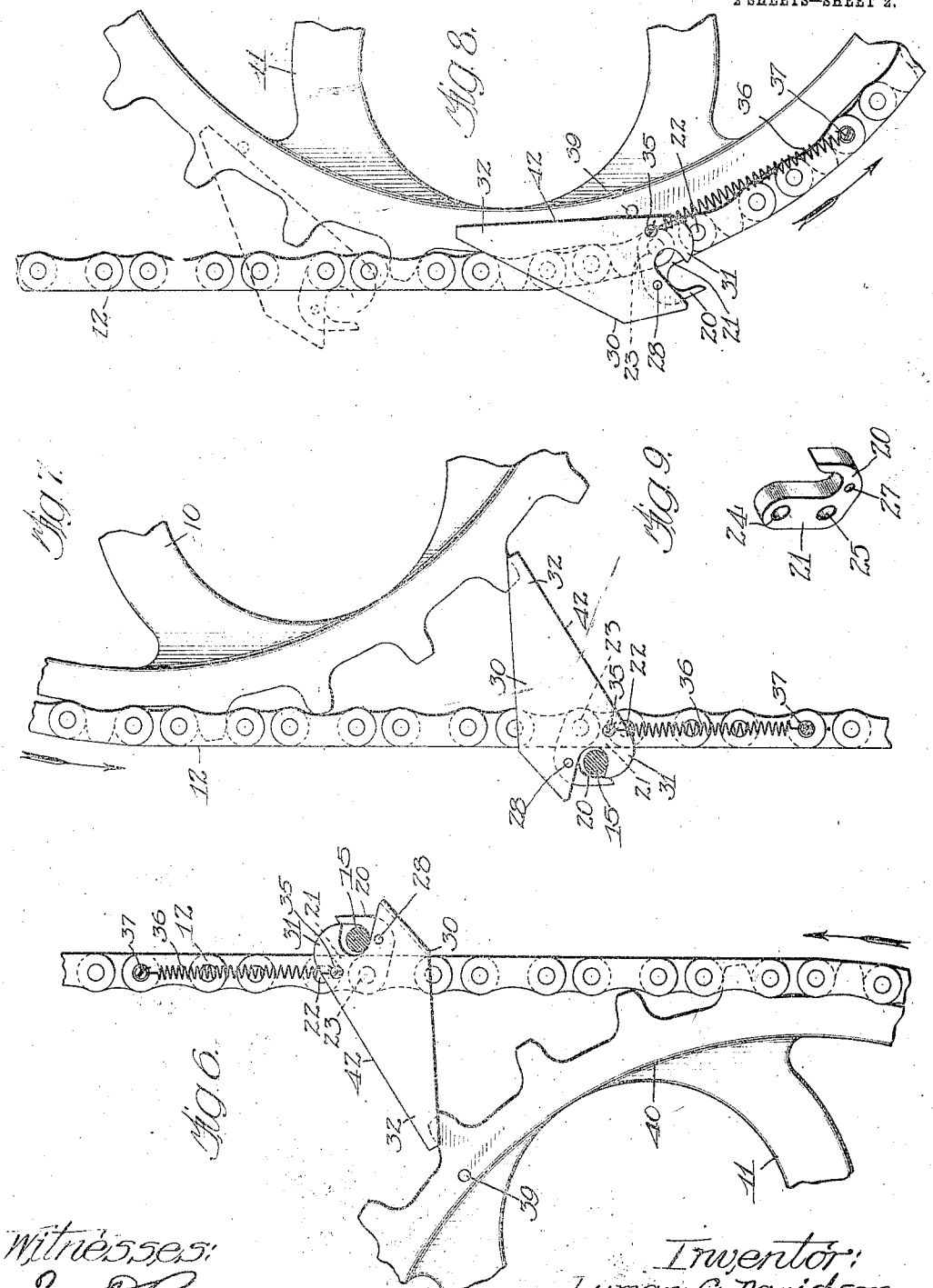

UNITED STATES PATENT OFFICE

LYMAN C. DAVIDSON, OF CHICAGO, ILLINOIS, ASSIGNOR TO BIG 4 MANUFACTURING COMPANY, OF CHICAGO, ILLINOIS, A CORPORATION OF ILLINOIS.

LOAD-GRIPPING MECHANISM FOR CONVEYERS.

934,890.

Specification of Letters Patent. Patented Sept. 21, 1909.

Application filed October 26, 1908. Serial No. 459,558.

*To all whom it may concern:*

Be it known that I, LYMAN C. DAVIDSON, a citizen of the United States, residing at Chicago, in the county of Cook and State of Illinois, have invented a certain new and useful Improvement in Load-Gripping Mechanism for Conveyers, of which the following is a specification.

This invention relates to mechanism for automatically attaching and detaching members to be transported from a conveyer chain. For the purposes of illustration a single rod is used in the application to indicate the member so supported. Any sort of a mechanism may be hung upon this rod without departing from the invention.

The object of the invention is to provide a simple, neat and efficient mechanism carried by a conveyer chain which will automatically grip the object to be transported at one point of travel in the chain, hold it securely until another point is reached, usually on the opposite side of the same wheel, and means for automatically releasing the object so gripped.

The invention consists in a novel form of supporting member attached to a link of the chain and a novel gripping mechanism adapted to engage said supporting member and hold the object to be transported thereon this in combination with means for automatically operating the gripping member at predetermined points in the travel of the chain.

More in detail the invention consists in features of construction and methods of operation which will be hereafter more fully described and claimed as the specification proceeds.

Referring to the drawings, Figure 1 is a diagrammatic end view of the conveyer equipped with the device of this invention. Fig. 2 is a side view of the device of Fig. 1. Fig. 3 is an enlarged detail view of the gripping mechanism in the position shown in Fig. 1. Fig. 4 is a side view of the parts shown in Fig. 3. Fig. 5 is an enlarged detail view of the gripping dog. Fig. 6 is an enlarged detail view of the parts shown in Fig. 3, the gripping mechanism having traveled from the position of Fig. 3 upward a short distance. Fig. 7 is a detail view of the left hand half of the upper wheel shown in Fig. 1. Fig. 8 is a detail view of the left hand portion of the lower wheel shown in Fig. 1 showing the position which the parts assume when the gripping mechanism has released the object to be carried. Fig. 9 is a detail perspective view of the supporting member carried by the chain.

As heretofore stated the mechanism of this invention is designed to be applied to any sort of an object to be carried and to any sort of a conveyer mechanism. For purposes of illustration one form of such conveyer mechanism is shown in Figs. 1 and 2 consisting of two parallel pairs of sprocket wheels 10 and 11 and chains 12 spaced apart by any sort of suitable framework which is not shown. This conveyer mechanism shown in Figs. 1 and 2 is designed and intended to transport successively the rods 15 resting upon a table 16 adjacent to the mechanism onto another table 17 at the other side of the sprocket wheel 11. For purposes of illustration and description the wheel 11 is shown and will be referred to as the operating wheel for controlling the picking up and releasing of the objects to be transported. The sprocket chains 12 have in them sprocket links whose number is an even multiple of, that is to say two, four, six or eight and so on, times, this so that the same link will always engage the same sprocket in the operating wheel when it next passes over said wheel.

Mounted upon the sprocket chain at some predetermined point is a supporting hook or member 20 illustrated in detail in Fig. 9. In the particular case here illustrated this supporting member is carried by and is integral with the link 21 of the chain having link pins 22 and 23 passing through holes 24 and 25 therein, but this supporting member 20 may be secured to the chain by any other suitable means without departing from the invention. Each one of the chains 12 has one of these supporting members located as shown that are in the same horizontal line with each other and therefore when the ends of the rod 15 are supported thereon said rod lies approximately horizontal and may be readily transportable by the conveyer mechanism operating in the direction indicated by the various arrows in the drawings up from the table 16 toward the wheel 10. Through each one of these supporting members 20 is a hole 27 carrying a pin 28 on which the parallel spaced sides 30 of the locking member 31 carrying the locking teeth is journaled. It will be noticed that each of these pivots 28 is directly in line with the center of the surface on hook 31 which supports rod 15 (see Fig. 7) with the result that when on the side of the wheel shown in Fig. 7 the hooks support the rod 15 without the aid of any weight 32 or spring 36 hereafter described. The opposite ends of these locking members form as shown extending arm or lever portions 32 of relatively considerable length. On each one of the side members 30 of the locking member is a pin or stud 35 to which a retractile spring 36 is attached the opposite end of the spring being secured to the chain 12 at a distant point as for instance the link pin 30 with the result that these springs 36 always tend to rotate the locking members 31 in a clockwise direction about the shaft 28 and thereby close the locking teeth 31 about any particular rod 15 which may be upon the supporting members 20. As a matter of fact the pivoting of the parts of the locking member 30—31—32 and the location of the pivot point 28 and the gripping jaws 31 is such that the device works automatically and will support any load within its capacity without the springs 36 or weighted arms 32. The springs are added merely to insure positiveness and rapidity of action. This locking action is always maintained except when resisted by other mechanism designed to throw the device open or into the full line position of Fig. 3 so that the rod 15 may be inserted or removed. In the particular embodiment of the invention here illustrated this mechanism consists in the pin or oppositely extending bar or pins 39 mounted upon the rim 40 of the operating wheel 11 said pin or pins being designed to engage the inner face or faces 42 of the locking member 31 during the time that the locking mechanism is adjacent thereto that is to say while it is passing over the lower 180 degrees of the path of travel of the circumference of the wheel 11 and hold it open in the position shown in Fig. 3.
In the operation of the device assume that the parts are in the position of Fig. 3 and that the wheel 11 is being rotated by any suitable source of power in the direction of the position indicated by the arrow. In this position the locking members 30 or 31 are thrown to open position and as the wheel rotates the supporting members 20 engage the rod 15 which has run down the incline table 16 into contact therewith and lifts said rod upward in the direction of the arrow of Fig.
1. As the mechanism travels from the position shown in Fig. 3 to that shown in Fig. 6 the pin 39 travels gradually away from engagement with the face 42 of the locking dog, with the result that the teeth 31 are moved to the position of Fig. 1 in which they grip the rod 15 and hold it upon the supporting members 20. This gripping action continues throughout the time that the particular rod 15 is traveling up the right hand side of the conveyer over the wheel 10 thence through the position of Fig. 7 and down into contact with the wheel 11 again. During this time the pin 39 has traveled around the wheel 11 and because of the proportioning of the number of sprocket teeth in the wheel 11 to the sprocket links in the chain 12 as heretofore described is in a position ready to engage the face or faces 42 of the arms 32 as the locking member again comes in contact with the wheel. As soon as the parts arrive at this position they first move to the position shown in dotted lines in Fig. 8 and finally to the full line position of that figure in which the locking member is rotated to open position and the rod 15 which has just been carried by it is free to drop by gravity onto the table and roll away. From this position the gripping mechanism returns, in open position, to the position of Fig. 3 where it receives another rod 15 from table 16.

For purposes of illustration two sets of gripping mechanisms are shown in Figs. 1 and 2 but manifestly only one of such sets may be used without departing from the invention.

The claims are:

1. In mechanism of the class described an operating wheel, a conveyer mechanism moved by said operating wheel, a support upon the conveyer mechanism for an object to be transported, gripping mechanism comprising a load supporting hook pivoted to the support in such a position that the center of the supporting face of the hook is in a vertical line with and below the pivot when the particular parts are on the descending side of the conveyer, and a cam mechanism upon the wheel of the conveyer adapted to engage an extension from the hook when the portion of the conveyer mechanism carrying the gripping mechanism is in contact with said wheel, said cam being so proportioned as to hold the gripping hook open during the time it is adjacent to said wheel for the purposes specified.

2. In mechanism of the class described, the combination of an operating wheel, a conveyer chain passing over said wheel, a support for an object to be carried mounted upon the chain, gripping mechanism pivoted to the chain, a pin upon the wheel inside the circumference thereof engaging the gripping mechanism when the portion of the chain carrying the gripping mechanism is adjacent thereto adapted to hold the gripping mechanism open for the discharge of one object carried and the reception of another as described.

In witness whereof, I have hereunto subscribed my name in the presence of two witnesses.

LYMAN C. DAVIDSON.

Witnesses:
C. J. CHRISTOFFEL,
DWIGHT B. CHEEVER.